3,331,885
THERMOSETTING BINDERS
Stuart H. Rider, Longmeadow, and John R. Le Blanc, Wilbraham, Mass., assignors to Monsanto Company, a corporation of Delaware
No Drawing. Filed Nov. 29, 1963, Ser. No. 327,110
10 Claims. (Cl. 260—826)

This invention is directed to an improved low temperature curing resin and to a process for preparing a fibrous structure bonded with the improved low temperature curing resins.

Liquid thermosetting resins of the phenol-formaldehyde type are used extensively as binders for various materials. In particular, they have found extensive use in the bonding of fibers such as glass fibers and the so-called rock wool fibers. These resins, when used in such bonding applications, require being exposed to fairly high temperatures in order to advance or cure the phenol-formaldehyde resin to an infusible state. The temperatures employed are about 170° C. for a duration of at least 5 minutes or longer. It would be desirable, therefore, to have a resin system which can be advanced to an infusible state at low temperatures and in a short period of time and which exhibits good resistance to moisture degradation when used in a bonding application.

Therefore, it is an object of this invention to provide an improved low temperature curing thermosetting resin composition.

Another object of this invention is to provide a thermoset infusible resin composition.

Still another object of this invention is to provide a process for preparing a bonded fibrous structure.

Further another object of this invention is to provide a bonded fibrous structure.

Other objects of this invention will in part be obvious and will in part be set out and appear hereinafter.

Briefly, these and other objects of this invention are attained by an admixture of a (1) particular thermosetting liquid phenol-formaldehyde reaction product, (2) a composition which is either resorcinol or a particular formaldehyde condensate, and (3) a trialkoxy silane. It is essential in the instant invention that the component parts of the admixture be present in certain critical proportions.

The following examples are set forth to illustrate more clearly the principles and practices of this invention to one skilled in the art and they are not intended to be restrictive but merely to be illustrative of the invention herein contained. Unless otherwise stated herein, all parts and percentages are on a weight basis.

EXAMPLE I

To a reaction vessel fitted with an agitator, heater and condenser for refluxing under vacuum conditions, add 100 parts of phenol, 200 parts of 50% formalin and 3.5 parts of calcium hydroxide to provide a pH of about 8.0–9.0. The reaction is carried out at a temperature of about 60–62° C. for about three hours. The product is then cooled to about 30° C. and the pH is adjusted to 5.0–6.5 with hydrochloric acid. The resin is then cooled to room temperature. The reaction product is found to be infinitely water-dilutable in that 24 or more volumes of water can be mixed with one volume of the resin at a temperature of 24–26° C. without causing the mixture to exhibit haziness or milkiness.

EXAMPLE II

Part A

To 75% of the resin solids of Example I, 25% of the resin solids of a liquid methylated melamine-formaldehyde resin and 0.05% of gamma-aminopropyl triethoxy silane based on the total weight of the resin solids are added under agitation. The methylated melamine-formaldehyde resin employed herein is the methylated reaction product of 3.5 mols of formaldehyde per mol of melamine. The resin system of this example is also dilutable with 24 volumes of water.

Part B

Part A above is repeated except that the gamma-aminopropyl triethoxy silane is omitted therefrom. The resin consists of 75% of the resin solids of Example I and 25% of the resin solids of a liquid methylated melamine-formaldehyde resin.

EXAMPLE III

To a reaction vessel fitted with an agitator, heater and condenser for refluxing under vacuum conditions, add 100 parts of phenol, 200 parts of 50% formalin and 3.5 parts of calcium hydroxide to provide a pH of about 8.0–9.0. The reaction is allowed to react at a temperature of about 60–62° C. for about 3 hours. The product is then cooled to room temperature.

To 75% of the above resin solids, 25% of the resin solids of a resorcinol-formaldehyde resin and 0.05% of gamma-aminopropyl triethoxy silane based on the total weight of the resin solids are added under agitation. The resorcinol-formaldehyde resin employed herein is the reaction product of about 0.6 mol of formaldehyde per mol of resorcinol under alkaline conditions and wherein the reaction is carried out at a temperature of about 60° C. The resin system of this example is also dilutable with 24 volumes of water.

EXAMPLE IV

Example III is repeated except that in place of the resorcinol-formaldehyde resin, a phenol-resorcinol-formaldehyde resin is employed herein. The phenol-resorcinol-formaldehyde resin employed herein is prepared by reacting 3 mols of formaldehyde per mol of phenol under alkaline conditions and then the reaction product thereof is reacted with 3 mols of resorcinol under alkaline conditions. The resin system of this example is also dilutable with 24 volumes of water.

EXAMPLE V

Example III is repeated except that in place of the resorcinol-formaldehyde resin, resorcinol alone is employed herein. The resin system of this example is also dilutable with 24 volumes of water.

EXAMPLE VI

Example II, Part A, is repeated except that 0.5% of the gamma-aminopropyl triethoxy silane is employed herein in place of the 0.05% thereof. The resin system is also dilutable with 24 volumes of water.

EXAMPLE VII

Example VI is repeated except that in place of the 0.5% of the gamma-aminopropyl triethoxy silane, 0.5% of the acetic acid salt of the gamma-aminopropyl triethoxy silane is employed herein. The acetic acid salt of the gamma-aminopropyl triethoxy silane is prepared by adding a 10% acetic acid solution to the gamma-aminopropyl triethoxy silane. This resin system is also dilutable with 24 volumes of water.

EXAMPLE VIII

To use the above resin systems in the bonding applications as set forth in this example, the resin systems of Examples I–VII are diluted with water to a resin solids content of about 8%. Individual glass fiber mats of 9″ x 9" x 1" and having a density of about 1 lb./cu.ft. are individually immersed in the dilute resin solutions. The treated fibrous mats are then air dried to a condition wherein the volatile content of the treated fibrous mats is about 0.2 part of the liquid medium of the resin system per 1 part of the resin solids. This requires air drying the specimens at room temperature for about 15 minutes. The air dried samples are then weighed and found to have picked up about 15% of the resin based on the weight of the untreated fibrous mats. The mats are then exposed to a temperature of 120° C. for 2 minutes under a light pressure of about 25 p.s.i. gauge in order to advance the resin to the infusible state. The pressure applied to the fibrous mat is sufficient to reduce the thickness thereof to ¼". With the exception of the resin of Example I, all of the specimens did not exhibit any springback upon release of the pressure. This indicates good bonding of the fiibers and that the resins, with the above exception, have advanced to the infusible state. The fibrous mat treated with the resin of Example I had considerable springback showing that the resin did not sufficiently cure or advance to the infusible state thereby resulting in little or no bonding of the fibers thereof.

With the exception of the fibrous mat heated with the resin of Example I, 3" x 1" x ¼" samples are cut from each of the bonded fibrous mats prepared above and exposed to an atmosphere of 95% relative humidity and at a temperature of 65° C. for one hour. To determine and effect of the moisture on the bond strength, the thickness of the samples is measured before and after exposure to the moist atmosphere to determine if any increase thereof occurred. On increase in the thickness of the samples would show a degradation of the resin bond and a lack of moisture resistance. With the exception of the sample treated with the resin of Example II, Part B which contains no silane all other samples exhibited no increase in the thickness thereof again showing no degradation of the resin due to moisture. The test sample bonded with the resin of Example II, Part B, had an increase of about 30% in the thickness of the sample. This shows the resin bond without the silane is affected by moisture.

The instant invention is directed to an improved low temperature curing liquid thermosetting resin composition and to a process for preparing a fibrous structure bonded with the improved low temperature curing resin composition. The improved composition comprises in admixture (a) 70–85 weight percent of a particular liquid phenol-formaldehyde resin product, (b) 30–15 weight percent of a particular composition, and (c) 0.001–2.0 weight percent of a trialkoxy silane. The particular compositions of (b) above employed in the admixture can be either resorcinol, aminotriazine-formaldehyde condensates, phenol-resorcinol - formaldehyde condensates or resorcinol-formaldehyde condensates, or mixtures thereof. The trialkoxy silane employed herein is selected from the group consisting of amine trialkoxy silanes, glycidyl trialkoxy silanes and water-soluble organic acid salts of amine trialkoxy silanes and mixtures of these particular silanes.

The particular phenol-formaldehyde condensate employed herein is prepared by the condensation reaction of 1.0–4.0 mols of formaldehyde per mol of phenol using an alkalaine catalyst. The reaction is carried out at a temperature of between 50–70° C. and preferably 60–65° C. and at a pH of 7.5–11.0 and preferably 8.0–9.5. If the phenol-formaldehyde resin is to be admixed with an aminotriazine-formaldehyde condensate, then the pH of the phenol-formaldehyde resin must be first adjusted to a pH of 5.0–7.0 with hydrochloric acid. When employing either resorcinol-formaldehyde, phenol-resorcinol-formaldehyde, resorcinol or mixtures thereof with the phenol-formaldehyde resin, the pH of the phenol-formaldehyde resin is not adjusted and is left at a pH of 7.5–11.0 and preferably 8.0–9.5. It should be emphasized that the above limitations are critical and that any deviation therefrom will result in a resin system which cannot be advanced to the infusible state when exposed to the very low temperatures and in the short periods of time stated previously.

The phenol-formaldehyde condensate as prepared above is a liquid one-stage resin prepared by the condensation reaction of 1.0–4.0 mols of formaldehyde and preferably 2.5–4.0 mols per mol of phenol under alkaline conditions. The condensate is recovered in a liquid medium which can be either a water system, a water-organic solvent system or an organic solvent system.

The material admixed with the liquid phenol-formaldehyde condensate can be either resorcinol, aminotriazine-formaldehyde condensates, phenol-resorcinol-formaldehyde condensates, resorcinol-formaldehyde condensates or mixtures thereof. These materials may be in either solid or liquid form with the only provision that the compositions be compatible with the liquid phenol-formaldehyde resin. The aminotriazine-formaldehyde condensates suitable for use herein are the melamine-formaldehyde and substituted melamine-formaldehyde condensates. The substituted melamine-formaldehyde condensates are the alkyl and aryl melamine-formaldehyde resins wherein the alkyl groups can contain 1–6 carbon atoms per each alkyl group and preferably 1–4 carbon atoms. Typical examples of some of the alkyl substituted melamine-formaldehyde condensates are the monomethyl, dimethyl, trimethyl, monoethyl and 1-methyl-3-propyl-5-butyl melamine-formaldehyde condensates. Mixtures of any of the above alkyl substituted melamine-formaldehyde condensates may be employed herein. The aryl substituted melamine-formaldehyde condensates can contain 1–2 phenyl radicals and preferably 1 phenyl radical per each aryl substituted group. Some of the aryl substituted melamine-formaldehyde condensates are monophenyl and diphenyl melamine-formaldehyde resins. Mixtures of any of the above aryl substituted melamine-formaldehyde resins may be employed herein. It should also be noted that mixtures of melamine-formaldehyde condensates and substituted melamine-formaldehyde condensates may also be used. The preferred material employed in admixture with the liquid phenol-formaldehyde condensate is a methylated melamine-formaldehyde condensate.

The resorcinol-formaldehyde condensate employed herein is the reaction product of about 0.5–0.9 mol of formaldehyde per mol of resorcinol. Generally, the reaction is carried out under alkaline conditions and at temperatures of about 50–100° C.

The phenol-resorcinol-formaldehyde condensate employed herein is the reaction product of about 1.0–4.0 mols of formaldehyde and 1–3 mols of resorcinol each per mol of phenol. The reaction is carried out under alkaline conditions. Generally, the phenol and formaldehyde are first reacted together and then the reaction product is reacted with the resorcinol to provide the phenol-resorcinol-formaldehyde condensate.

The particular silanes employed in the practice of this invention can be any of the trialkoxy silanes. However, particularly useful are the amine trialkoxy silanes, glycidyl trialkoxy silanes or the water-soluble organic acid salts of amine trialkoxy silanes, or mixtures thereof. The amine trialkoxy silanes correspond to the following formula:

(RO)$_3$SiR"NHR' wherein R is an alkyl radical containing 2–9 carbon atoms, R' is independently selected from the group consisting of hydrogen, an alkyl radical of 2–9 carbon atoms and primary, secondary and tertiary amines and R" is an alkylene radical containing 2–9 carbon atoms. Some of the amine trialkoxy silanes that can be employed in place of the silane used in the examples are N-ethyl gamma-aminopropyl triethoxy silane, gamma-aminopropyl trimethoxyl silane, gamma-aminopropyl tributoxy silane, delta-aminobutyl triethoxy silane, zeta aminohexyl triethoxy silane and N-aminopropyl gamma-aminopropyl triethoxy silane. The preferred amine trialkoxy silane is gamma-aminopropyl triethoxy silane.

The glycidyl trialkoxy silanes correspond to the following formula:

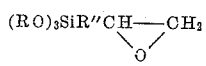

wherein R is an alkyl radical containing 2–9 carbon atoms and R″ is an alkylene radical containing 2–9 carbon atoms. Some of the glycidyl trialkoxy silanes that can be employed in place of the silane used in the examples are glycidoxypropyl triethoxy silane, and glycidoxypropyl tributoxy silane. In some cases it may be necessary to add the silane to the resin as a solvent solution. Any of the well-known organic solvents can be used such as the organic alcohols, acetone, dioxane, etc. The preferred trialkoxy silane containing a glycidyl functional group is glycidoxypropyl trimethoxy silane.

The amount of silane employed in the practice of this invention can generally be any amount to give the added moisture resistance to the resin when advanced to the infusible state and can be up to 2.0 weight percent based on the weight of the resin solids or as little as 0.001 weight percent. Generally when less than 0.001 weight percent of the silane is employed, no apparent upgrading of the moisture resistance is obtained. Therefore, in the practice of this invention the amount of the trialkoxy silane employed should vary between 0.001 and 2.0 weight percent thereof based on the weight of the resin solids and preferably 0.001–1.0 weight percent thereof.

When using large amounts of the amine trialkoxy silane, it is possible that some loss in water-dilutability of the resin system can occur. It is believed that this may be due to a reaction between the amine functional group and the benzyl alcohol type of phenol employed therein to form a benzyl amine type compound which appears to be more noticeable as a haziness or cloudiness upon dilution of the resin composition. It is understood herein that the term "haziness" or "cloudiness" refers to the appearance of the resin composition having finely-suspended particles visible to the naked eye. The term "milkiness" refers to a greater degree of haziness or cloudiness. To avoid the possible reduction or loss in water-dilutability of the resin system containing the larger amounts of the amine trialkoxy silane, the amine trialkoxy silane can be first converted to a salt thereof. The particular useful salts are the water-soluble organic acid salts and include such acids as acetic acid, benzoic acid, citric acid, citraconic acid, formic acid, hydroxy acetic acid, isophthalic acid, maleic acid, phthalic acid and succinic acid. This aids in the solubitility of the particular silane in the resin by converting the silane to a soluble product and thus maintains the high degree of water-dilutability of the resin composition without affecting the moisture resistance of the cured resin. It should be noted that if slight haziness occurs when using the acetic acid salt of the silane, additional amounts of acetic acid added to the resin will clear up the haziness. In addition, it has also been observed that if slight haziness should occur from the unconverted silane, the haziness is not increased by further dilution with water nor is the bonding strength of the resin affected by the formation of such slight haziness.

It is essential in the practice of this invention that the component parts thereof be admixed in the critical proportions set forth previously in order to provide a low temperature curing resin system. The proportions are 70–85 weight percent of the liquid phenol-formaldehyde resin, 30–15 weight percent of the resorcinol or the particular formaldehyde condensates or mixtures thereof and 0.001–2.0 weight percent of the trialkoxy silane. By low temperature curing, it is meant that the resin composition herein described will sufficiently cure or advance to an infusible state at temperatures of from 105–130° C. in about 1½–5 minutes. Since the resin is advanced to the infusible state, the resin will sufficiently bond materials therewith providing good bonding strength. This is surprising and unusual since phenol-formaldehyde resin systems require higher temperatures and generally longer exposure times at these higher temperatures in order to advance the resin to the infusible state.

The instant invention is also directed to a process for preparing a fibrous structure bonded with the thermoset resin composition of this invention which has been cured or advanced to an infusible state. The process comprises treating the fibrous structure with the low temperature curing liquid thermosetting resin composition to the extent that the resin on the treated fibrous structure has a volatile content of up to 0.3 part of the liquid medium and preferably 0.05–0.2 part per 1 part of the resin solids and then heating the treated fibrous structure to a temperature of 105–130° C. for about 1½–5 minutes in order to advance the resin to an infusible state. Preferably, the structure can be heated to a temperature of 115–125° C. for about 2–4 minutes. During the heating step, the fibrous structure can also be subjected to light pressures of from 1–2 lbs./sq. in. gauge to as high as is necessary for forming the desired structure and preferably about 1–50 p.s.i. gauge.

In the practice of this invention in treating fibrous materials, it is necessary that the volatile content be controlled to the extent set forth above. If the liquid medium is present in excess of that required, the resin will not advance to the infusible state at the low temperatures of 105–130° C. nor in the short period of time indicated previously. The liquid medium referred to herein is either an aqueous medium, a water-organic solvent medium or an organic solvent medium depending upon which is employed in recovering the phenol-formaldehyde resin.

In the practice of this invention, the component parts can be admixed in various ways. For example, the phenol-formaldehyde resin and the resorcinol or the particular formaldehyde condensates can be first admixed together in the proportion so indicated. To this mixture can then be added the particular trialkoxy silane. Alternatively, the silane may be first admixed with either the phenol-formaldehyde reaction product or with the second component part of the admixture namely either the resorcinol or the particular formaldehyde condensates. The two component parts can then be admixed prior to the application of the resin. It has been surprisingly noted that when adding the trialkoxy silane to either the melamine-formaldehyde resin, resorcinol, resorcinol-formaldehyde or phenol-resorcinol-formaldehyde, the storage stability of such combinations has been found to be greater than three months without any formation of haziness or milkiness. Therefore, in the practice of this invention it is preferred that the silane be first admixed with the second component part of the admixture prior to admixing the second component part with the phenol-formaldehyde reaction product. If it is desired to first admix the silane with the phenol-formaldehyde reaction product, it is preferred to use the organic acid salt of the silane.

The resins of this invention may be applied in either concentrated or diluted form. The bonding strength is not affected in either case. The dilutability of the resin composition of this invention is excellent and considered to be infinitely water-dilutable without the formation of haziness, cloudiness or milkiness occurring in the resin system. The resin composition set forth herein can be diluted with 24 volumes of water or more without exhibiting any precipitation forming in the resin. A resin is considered to be infinitely water-dilutable if it is diluted with 24 volumes of water without any precipitation forming.

As shown in the examples, another outstanding feature of the resin composition set forth herein is that when employed to bond fibrous structures, the bonded structures have excellent resistance to moisture degradation. This excellent resistance to moisture degradation still remains even though the resin composition is stored for 5 months or longer and then used to bond the fibrous structure. In tests run using resins that have been stored for 5 months or longer, test specimens have shown that no swelling occurs when exposing the test specimens to the humidity conditions set forth in Example VIII.

The resin composition of this invention has many useful applications such as the bonding of glass fibers or rock wool and cellulose products for battery separators, for use in electrical insulation and for filters and the like. Further the resin compositions of this invention can be successfully employed for preparing decorative or industrial grade laminates, surface coatings, impregnates, adhesives, and the like.

It will thus be seen tha the objects set forth above, among those made apparent from the preceding description, are efficiently attained and since certain changes may be made in carrying out the above process or method without departing from the scope of this invention, it is intended that all matter contained in the above description shall be interpreted as illustrative and not in a limiting sense.

What is claimed is:
1. An improved low temperature curing liquid thermosetting resin composition consisting of in admixture (a) 70–85 weight percent of a particular liquid phenol-formaldehyde reaction product, (b) 30–15 weight percent of a composition selected from the group consisting of resorcinol, aminotriazine-formaldehyde condensates, phenol-resorcinol-formaldehyde condensates and resorcinol-formaldehyde condensates, and mixtures thereof, the combined weight percent of (a) and (b) being 98–99.999 weight percent of the composition, and (c) 0.001–2.0 weight percent of a water-soluble organic acid salt of an amine trialkoxy silane corresponding to the formula $(RO)_3SiR''NHR'$ wherein R is an alkyl radical containing 2–9 carbon atoms, R' is a member selected from the group consisting of hydrogen and alkyl radicals of 2–9 carbon atoms, and R'' is an alkylene radical containing 2–9 carbon atoms; said liquid phenol-formaldehyde reaction product being the alkaline catalyzed reaction product of 1.0–4.0 mols of formaldehyde per mol of phenol providing that when the admixture shall contain an aminotriazine-formaldehyde condensate, the phenol-formaldehyde reaction product shall have a hydrochloric acid adjusted pH of 5.0–7.0.

2. The composition of claim 1 wherein the liquid phenol-formaldehyde resin is a water-dilutable aqueous phenol-formaldehyde resin and the aminotriazine-formaldehyde condensate is a methylated melamine-formaldehyde resin.

3. The composition of claim 1 wherein the water-soluble organic acid salt of the amine trialkoxy silane is the acetic acid salt of gamma-amino propyl triethoxy silane.

4. The composition of claim 1 advanced to an infusible state.

5. A process for preparing a fibrous structure bonded with an improved thermoset resin composition and wherein the fibrous structure has excellent moisture resistance, which process comprises treating a fibrous structure with an improved low temperature curing liquid resin composition such that the fibrous structure has a volatile content of up to 0.3 part of the liquid medium of the thermosetting resin per 1 part of the thermosetting resin solids and then advancing the low temperature curing liquid resin composition to an infusible state by heating the treated fibrous structure to a temperature of 105–130° C. for about 1½–5 minutes, said low temperature curing liquid thermosetting resin composition consisting of in admixture (a) 70–85 weight percent of a particular liquid phenol-formaldehyde reaction product, (b) 30–15 weight percent of a composition selected from the group consisting of resorcinol, aminotriazine-formaldehyde condensates, phenol-resorcinol-formaldehyde condensates and resorcinol-formaldehyde condensates, and mixtures thereof, the combined weight percent of (a) and (b) being 98–99.999 weight percent of the composition, and (c) 0.001–2.0 weight percent of a water-soluble organic acid salt of an amine trialkoxy silane corresponding to the formula $(RO)_3SiR''NHR'$ wherein R is an alkyl radical containing 2–9 carbon atoms, R' is a member selected from the group consisting of hydrogen and alkyl radicals of 2–9 carbon atoms, and R'' is an alkylene radical containing 2–9 carbon atoms; said liquid phenol-formaldehyde reaction product being the alkaline catalyzed reaction product of 1.0–4.0 mols of formaldehyde per mol of phenol providing that when the admixture shall contain an aminotriazine-formaldehyde condensate, the phenol-formaldehyde reaction product shall have a hydrochloric acid adjusted pH of 5.0–7.0.

6. The process of claim 5 wherein the resin treated fibrous structure is subjected to a pressure of 1–50 p.s.i. gauge while advancing the low temperature curing resin to the infusible state.

7. The process of claim 5 wherein the fibrous structure consists of glass fibers.

8. The process of claim 5 wherein the fibrous structure consists of cellulosic fibers.

9. The process of claim 5 wherein the water-soluble organic acid salt of the amine-trialkoxy silane is the acetic acid salt of gamma-aminopropyl triethoxy silane.

10. A bonded fibrous structure prepared by the process of claim 5.

References Cited

UNITED STATES PATENTS

| | | | |
|---|---|---|---|
| 2,513,274 | 7/1950 | Barkhuff | 260—838 |
| 2,527,581 | 10/1950 | Searer et al. | 260—838 |
| 2,541,896 | 2/1951 | Vasileff et al. | 161—193 |
| 2,832,754 | 4/1958 | Jex et al. | 260—46.5 |
| 2,972,598 | 2/1961 | Morehouse | 260—46 |
| 2,990,307 | 6/1961 | Stalego | 260—839 |
| 3,038,875 | 6/1962 | Boyer et al. | 260—826 |

FOREIGN PATENTS

| | | |
|---|---|---|
| 584,176 | 1/1947 | Great Britain. |
| 1,281,514 | 12/1961 | France. |

SAMUEL H. BLECH, *Primary Examiner.*